(12) United States Patent
Su et al.

(10) Patent No.: US 6,424,189 B1
(45) Date of Patent: Jul. 23, 2002

(54) APPARATUS AND SYSTEM FOR MULTI-STAGE EVENT SYNCHRONIZATION

(75) Inventors: Jen-Pin Su; Tsan-Hui Chen, both of Hsinchu; Wen-Hsiang Lin, Hsinchu Hsien; Chun-Chieh Wu, Taichung; Chang-Fu Lin, Hsinchu, all of (TW)

(73) Assignee: Silicon Integrated Systems Corporation (TW)

( * ) Notice: Subject to any disclaimer, the term of this patent is extended or adjusted under 35 U.S.C. 154(b) by 22 days.

(21) Appl. No.: 09/687,418

(22) Filed: Oct. 13, 2000

(51) Int. Cl.[7] .................................................. H03L 7/00
(52) U.S. Cl. ........................................ 327/141; 327/145
(58) Field of Search .................................. 327/141, 145, 327/144, 151, 160; 375/356, 357, 358

(56) References Cited

U.S. PATENT DOCUMENTS

| 5,455,831 | A | * | 10/1995 | Bartow et al. | ............... | 375/358 |
|---|---|---|---|---|---|---|
| 5,726,595 | A | | 3/1998 | Lin et al. | ..................... | 327/155 |
| 5,859,882 | A | * | 1/1999 | Urbansky | ................... | 327/160 |
| 6,055,285 | A | * | 4/2000 | Alston | ........................ | 375/356 |
| 6,148,051 | A | * | 11/2000 | Fujimori et al. | ............ | 375/356 |

* cited by examiner

*Primary Examiner*—Kenneth B. Wells
*Assistant Examiner*—Linh Nguyen
(74) *Attorney, Agent, or Firm*—Senniger, Powers, Leavitt & Roedel

(57) ABSTRACT

The present invention discloses an apparatus and system for multi-stage event synchronization, whose main object is to eliminate the drawbacks of an expensive synchronization circuit used to balance the data transmissions between an origination agent and a destination agent operating at different frequencies or clock phases as in prior art. The apparatus of the present invention organizes the slower one with multi-stage chains, each of which comprises a simple synchronization circuit and an XOR gate, for receiving the number of events transmitted from the faster one. Therefore, the slower one will not miss the data from the faster one.

9 Claims, 9 Drawing Sheets

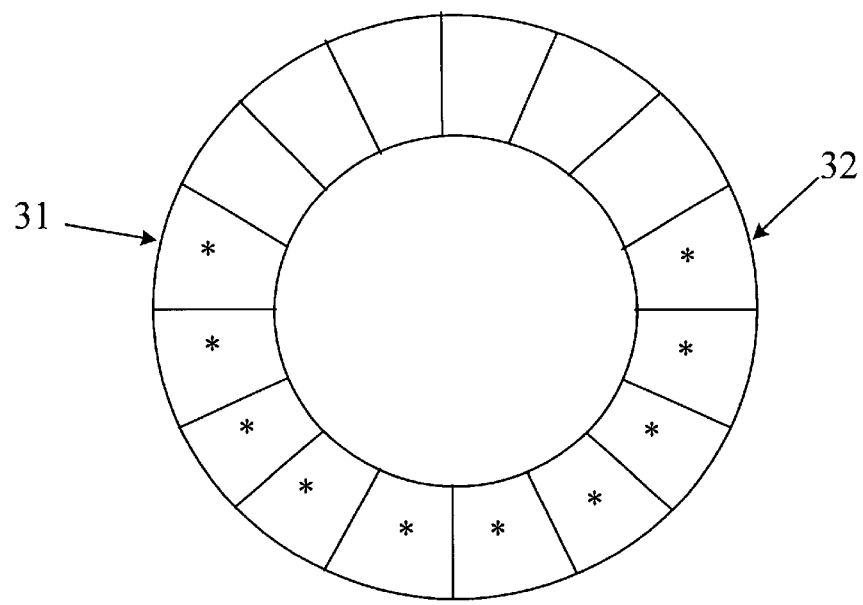
FIG. 3    (PRIOR ART)
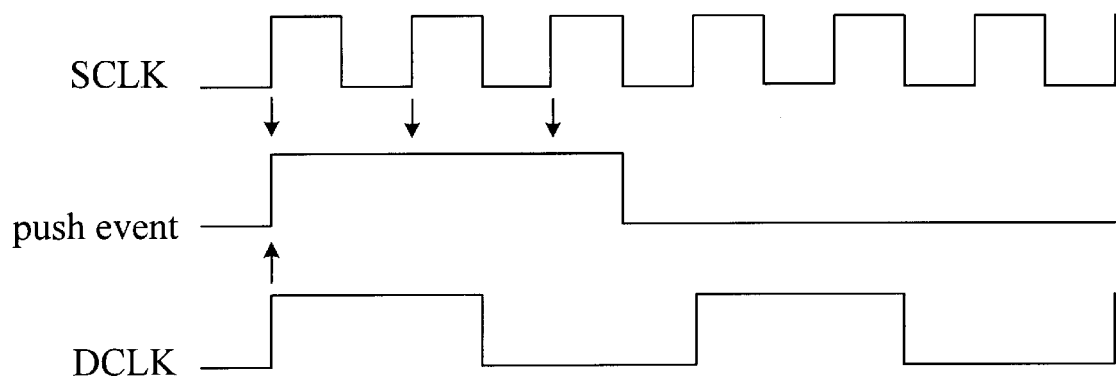
FIG. 6

APPARATUS AND SYSTEM FOR MULTI-STAGE EVENT SYNCHRONIZATION

BACKGROUND OF THE INVENTION

1. Field of the Invention

The present invention relates to an apparatus and a system for event synchronization, and particularly to an apparatus and a system for multi-stage event synchronization which buffers data in data transmissions between an origination agent and a destination agent at different operating frequencies or at equal frequency but different phases.

2. Description of the Related Art

As far as circuit designs are concerned, since the two ends of data transmission between an origination agent and a destination agent operate at different frequencies or at equal frequency but different phases, one end captures data directly transmitted from another end in edge-triggered form will cause errors. FIG. 1 is a schematic diagram of a prior art event synchronization apparatus, wherein an intermediate agent 11 is situated between an origination agent 14 and a destination agent 15 for buffering the data transmitted between the origination agent 14 and destination agent 15. The intermediate agent 11 comprises a FIFO (First In First Out) 12 and a control module 13, wherein the FIFO 12 is a dual-port structure connected to the origination agent 14 and destination agent 15 through a data bus 18 and 18' respectively, and the control module 13 is connected to the origination agent 14 and destination agent 15 through a control bus 19 and 19' respectively. The FIFO module 12 and control module 13 communicate each other through a producing interface 16 and a consuming interface 17. The structure in FIG. 1 operates in two modes. In the first mode, data from the origination agent 14 are transmitted to the FIFO module 12 through the data bus 18, while in the second mode, the destination agent 15 reads the data stored in the FIFO module 12 through the data bus 18'. Under the first mode, the origination agent 14 notifies the control module 13 through the control bus 19 of the fact that data will be transmitted, and the control module 13 first examines if the FIFO module 12 is full by the producing interface 16. If it is full, the control module 13 notifies the origination agent 14 through the control bus 19 to stop transmitting data to the FIFO module 12. If it is not full, the control module 13 notifies the origination agent 14 through the control bus 19 to transmit data to the FIFO module 12, and updates the pointer pointing to the next storing location by the producing interface 16. Under the second mode, the destination agent 15 notifies the control module 13 through the control bus 19' of the fact that data will be transmitted, and the control module 13 first examines if the FIFO module 12 is empty by the consuming interface 17. If it is empty, the control module 13 notifies the destination agent 15 through the control bus 19' to stop transmitting data from the FIFO module 12. If it is not empty, the control module 13 notifies the destination agent 15 through the control bus 19' to transmit data from the FIFO module 12, and updates the pointer pointing to the next reading location by the consuming interface 17.

FIG. 2 is a schematic diagram of a prior art FIFO module, mainly comprising a producing end 28, a consuming end 27 and a FIFO buffer 29. The producing end 28 includes a producing module 24 and a first counter 22, and connects the producing interface 16 and the FIFO buffer 29. The producing module 24 is used to generate a rear pointer pointing to the currently storing location, and the first counter 22 is an up-down counter for accumulating the number of buffering data in the FIFO buffer 29. The consuming end 27 includes a consuming module 21 and a second counter 23, and connects the consuming interface 17 and the FIFO buffer 29. The consuming module 21 is used to generate a front pointer pointing to the currently reading location, and the second counter 23 is an up-down counter for accumulating the number of buffering data in the FIFO buffer. When the producing end 28 executes a push event, meaning that the origination agent 14 wants to store data to the FIFO buffer 29, the producing end 28 first examines the content of the first counter 22. If the content is equal to a storing maximum, representing the FIFO buffer 29 is full, a "full condition" is issued and the origination agent 14 is notifies to stop transmitting data to the FIFO buffer 29. If the content is not equal to the storing maximum, the producing module 24 sends the rear pointer to the FIFO buffer 29 and the data from the origination agent 14 are stored in the location the rear pointer points to in the FIFO buffer 29. Meanwhile, the first counter 22 and the second counter 23 will count up by adding the number of the push events. Likewise, when the consuming end 27 executes a pop event, meaning that the destination agent 15 wants to read data from the FIFO buffer 29, the consuming end 27 first examines the content of the second counter 23. If the content is equal to a storing minimum, representing the FIFO buffer 29 is empty, an "empty condition" is issued and the destination agent 15 is notifies to stop transmitting data from the FIFO buffer 29. If the content is not equal to the storing minimum, the consuming module 21 sends the front pointer to the FIFO buffer 29 and the data to the destination agent 15 are stored in the location the front pointer points to in the FIFO buffer 29. Meanwhile, the first counter 22 and the second counter 23 will count down by subtracting the number of the pop events. Because the functions of the first counter 22 and second counter 23 are the same, one of them can be neglected. However, since the second counter 23 is used to control the consuming end 27 and the first counter 22 is used to control the producing end 28, for the sake of module design, both of them are better used.

FIG. 3 is a schematic diagram of a prior art FIFO buffer. The FIFO buffer 29 is used to store and forward the data from the origination agent 14 and to the destination agent 15, especially when the origination agent 14 and the destination agent 15 operate at different frequencies or at equal frequency but different phases. The mark "*" on an entry of the FIFO buffer 29 represents a sum of useful data are present in the entry. The rear pointer 32 and front pointer 31 represent a starting point and an ending point of a plurality of useful data in the FIFO buffer 29. When a push event occurs, whether the value of the rear point 32 plus one is equal to the value of the front point 31 is first examined. If the answer is yes, it represents the FIFO buffer 29 is full. If no, representing the FIFO buffer 29 is not full, the rear pointer 32 moves forward one step, meaning that the value of the rear pointer 32 is added by one. When a pop event occurs, whether the value of the front point 31 is equal to that of the front point 31 is first examined. If the answer is yes, it represents the FIFO buffer 29 is empty. If no, representing the FIFO buffer 29 is not empty, the front pointer 31 moves forward one step, meaning that the value of the front pointer 31 is added by one. The accumulation of the rear pointer 32 and front pointer 31 are calculated in modulo. As an example of sixteen entries in the structure of FIG. 3, the next value of the rear pointer 32 or front pointer 31 is 0 if the current value is 15.

The structure shown in FIG. 2 is not suitable for practical use if the origination agent 14 and destination agent 15 operate at different frequencies or at equal frequency but different phases. Under the circumstances, the first counter 22 will misunderstand the number of pop events in the consuming end 27, and the second counter 23 will misunderstand the number of push events in the producing end 28. As such, an adequate synchronization circuit should be added to ensure the correct behavior of this system.

FIG. 4 is a structural diagram of a well-known simple synchronization circuit, comprising a producing circuit 47 with a higher-frequency clock SCLK (source clock domain) and a consuming circuit 48 with a lower-frequency clock DCLK (destination clock domain). The producing circuit 47 comprises a first register 41 and a logic cloud 42. The consuming circuit 48 comprises a first and a second data paths, wherein the first data path includes a second register 43 and a fourth register 45, and the output of the first data path is designated as 406; the second data path includes a third register 44 and a fifth register 46, and the output of the second data path is designated as 407.

FIG. 5 is a timing diagram of FIG. 4. Since a clock skew is likely to occur in the circuit, it is presumed that a clock skew exists between the clock 402 of the first data path and the clock 403 of the second data path in the consuming circuit 48. If the output 401 of the producing circuit 47 changes its state exactly on the rising edge of the clock 402 of the first data path in the consuming circuit 48, due to not satisfying the definition of setup time and hold time of the second register 43, the output 404 of the second register 43 will generate a pulse of capturing failure so called as "metastable state". On the other hand, the clock 403 of the second data path falls behind the clock 402 of the first data path due to clock skew. Therefore the setup time and hold time of the third register 44 is satisfied and the third register 44 can correctly captures the output 401 of the producing circuit 47. By comparing the timing differences between the first data path and the second data path, it can be found that the output 406 of the fourth register and the output 407 of the fifth register are unequal at period 1T. But after the period 2T, the output 406 of the fourth register and the output 407 of the fifth register will be equal. In other words, correct values are present at the output of the consuming circuit 48 after two clock cycles required for filtering the metastable state. Despite of all these efforts, the circuit in FIG. 4 is only suitable to capture data in a level-triggered type, meaning that the pulse width of the input data should be larger than the pulse width of the clocks SCLK and DCLK, and is not suitable to capture data in an edge-triggered form.

FIG. 6 explains why the structure shown in FIG. 4 cannot be applied to an edge-triggered form. Since the clock SCLK in the origination agent 14 operates at a higher frequency than the clock DCLK in the destination agent 15, if the producing end 28 and consuming end 27 capture data on the rising edge of SCLK and DCLK in an edge-triggered form, for a plurality of push events in the producing end 28, the producing end 28 samples 3 times, while the consuming end 27 only samples 1 time. The method mentioned above is called "simple synchronization", which samples incremental number of the push events in the producing end directly with the clock DCLK in the consuming end 27; or samples incremental number of the pop events in the consuming end directly with the clock SCLK in the producing end 28. It will inevitably generate errors to sample data between two regions at different frequencies or phases.

Another solution to solve the problems of capturing errors between an origination agent and a destination agent at different frequencies is disclosed in U.S. Pat. No. 6,055,285, entitled "SYNCHRONIZATION CIRCUIT FOR TRANSFERRING POINTER BETWEEN TWO ASYNCHRONOUS CIRCUITS." The method connects a write address bus of a first synchronization circuit to a write controller and a FIFO buffer, connects a synched write pointer of the first synchronization circuit to a read controller, connects a read address bus of a second synchronization circuit to a read controller and a FIFO buffer, connects a synched read pointer of the second synchronization circuit to a write controller. Although the method solves the problems of capturing errors between the origination agent and destination agent at different frequencies, the hardware cost is expensive due to the use of the write address bus, read address bus, synched read pointer and synched write pointer.

SUMMARY OF THE INVENTION

Accordingly, an object of the present invention is to eliminate the drawbacks of an expensive synchronization circuit used to balance the data transmissions between an origination agent and a destination agent operating at different frequencies or clock phases as in prior art. To this end, the present invention provides a multi-stage event synchronization apparatus. The apparatus organizes the slower one with multi-stage chains, each of which comprises a simple synchronization circuit and an XOR gate, for receiving the number of events transmitted from the faster one. Therefore, the slower one will not miss the data from the faster one.

The main goal of the present invention is to build a synchronous interface, which notifies the producing end 28 of the number of pop events in the consuming end 27 and notifies the consuming end 27 of the number of push events in the producing end 28. There is a counter each inside the consuming end 27 and producing end 28, which correctly calculates the number of buffering data in the FIFO buffer 29. If the number of buffering data is equal to the maximum of the FIFO buffer, a "full condition" is issued to stop data transmissions from the origination agent 28. If the number of buffering data is equal to the minimum of the FIFO buffer, an "empty condition" is issued to stop data transmissions to the destination agent 27.

Another object of the present invention is to avoid a metastable state caused by a clock skew occurring between the clocks in the destination agent and the origination agent in sampling push events or sampling pop events in an edge-triggered form.

The present invention discloses an apparatus for multi-stage event synchronization, comprising a first event synchronizer, a second event synchronizer, a second counter and a first counter. The first event synchronizer is used to convert the number of pop events executed in said destination agent into the number of sampled events that can be captured by a clock used in said origination agent. The second event synchronizer is used to convert the number of push events executed in said origination agent into the number of sampled events that can be captured by a clock used in said destination agent. The second counter counts down by one if a pop event is executed in said destination agent, counts up by one if an event is sent from said second event synchronizer, and sends an empty signal if the content of said second counter is equal to the minimal number of buffers said intermediate agent can supply. The first counter counts up by one if a push event is executed in said origination agent, counts down by one if an event is sent from said first event synchronizer, and sends a fill signal if the content of said first counter is equal to the maximal number of buffers said intermediate agent can supply.

The second event synchronizer comprises a stage generation unit, an event allocation unit and a synchronization unit.

The stage generation unit is used to generate an encoding of a stage number N, wherein N is an integer larger than the result of the pulse width of the clock used in said destination agent divided by the pulse width of the clock used in said origination agent. The event allocation unit is connected to said stage generation unit for averagely allocating push events executed in said origination agent into N-stage data path. The synchronization unit is connected to said event allocation unit for converting the number of push events in said N-stage data path into the number of sampled events that can be captured by the clock of said destination agent.

The first event synchronizer comprises a stage generation unit, an event allocation unit and a synchronization unit. The stage generation unit is used to generate an encoding of a stage number M, wherein M is an integer larger than the result of the pulse width of the clock used in said origination agent divided by the pulse width of the clock used in said destination agent. The event allocation unit is connected to said stage generation unit for averagely allocating pop events executed in said destination agent into M-stage data path. The synchronization unit is connected to said event allocation unit for converting the number of pop events in said M-stage data path into the number of sampled events that can be captured by the clock of said origination agent.

The present invention discloses a system for multi-stage event synchronization, comprising an FIFO buffer, a multi-stage event synchronization, a consuming module, a producing module and a control module. The FIFO buffer includes an input end and an output end. The input end is connected to said origination agent through a data bus, and said output end is connected to said destination agent through a data bus. The multi-stage event synchronization apparatus is used to accumulate the number of buffering data in said FIFO buffer. The apparatus converts the number of pop events that can be captured executed in said destination agent into the number of sampled events that can be captured by the clock used in said origination agent, and converts the number of push events executed in said origination agent into the number of sampled that can be captured by the clock used in said destination agent. If the result of the number of push events executed in said origination agent subtracting the number of pop events executed in said destination agent converted into the number of sampled events that can be captured by the clock used in said origination agent reaches the maximal number that said FIFO buffer can supply, said apparatus transmits a full signal. If the result of the number of push events executed in said origination agent converted into the number of sampled events that can be captured by the clock used in said destination agent subtracting the number of pop events executed in said destination agent reaches the minimal number that said FIFO buffer can supply, said apparatus transmits an empty signal. The consuming module is used to generate a front pointer pointing to the location of said FIFO buffer being read. The producing module is used to generate a rear pointer pointing to the location of said FIFO buffer being stored. The control module is used to control the data transmissions between an FIFO buffer, an origination agent and a destination agent. The control module stops storing data into said origination agent if a full signal is present. The control module stops sending data to said destination agent if an empty signal is presented.

BRIEF DESCRIPTION OF THE DRAWINGS

The invention will be described according to the appended drawings in which:

FIG. 3 is a schematic diagram of a prior art FIFO buffer;

FIG. 6 a timing specification that explains why the structure shown in FIG. 4 cannot be used in an edge-triggered form;

PREFERRED EMBODIMENT OF THE PRESENT INVENTION

Figure 1:
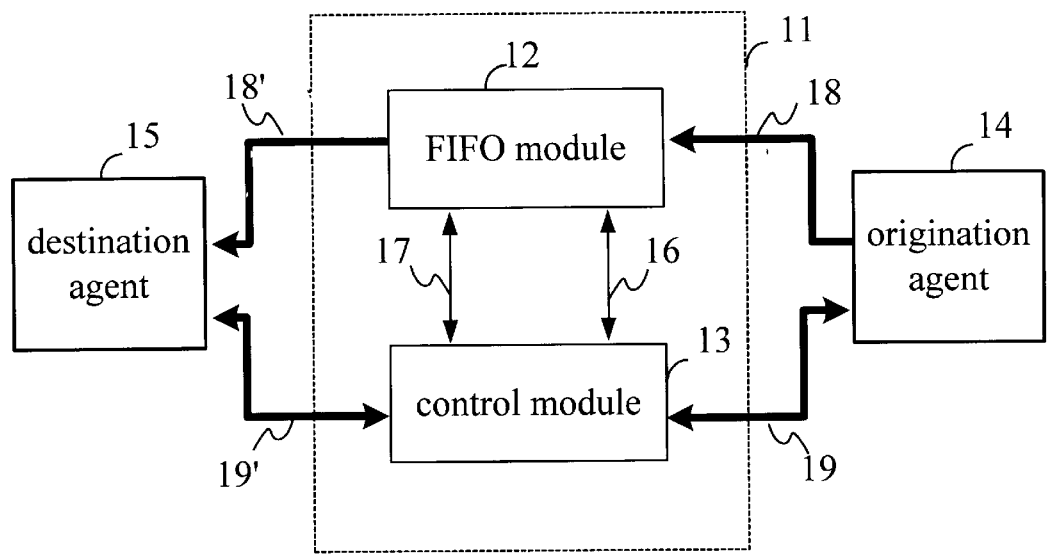
FIG. 1 is a schematic diagram of a prior art event synchronization apparatus.
Figure 2:
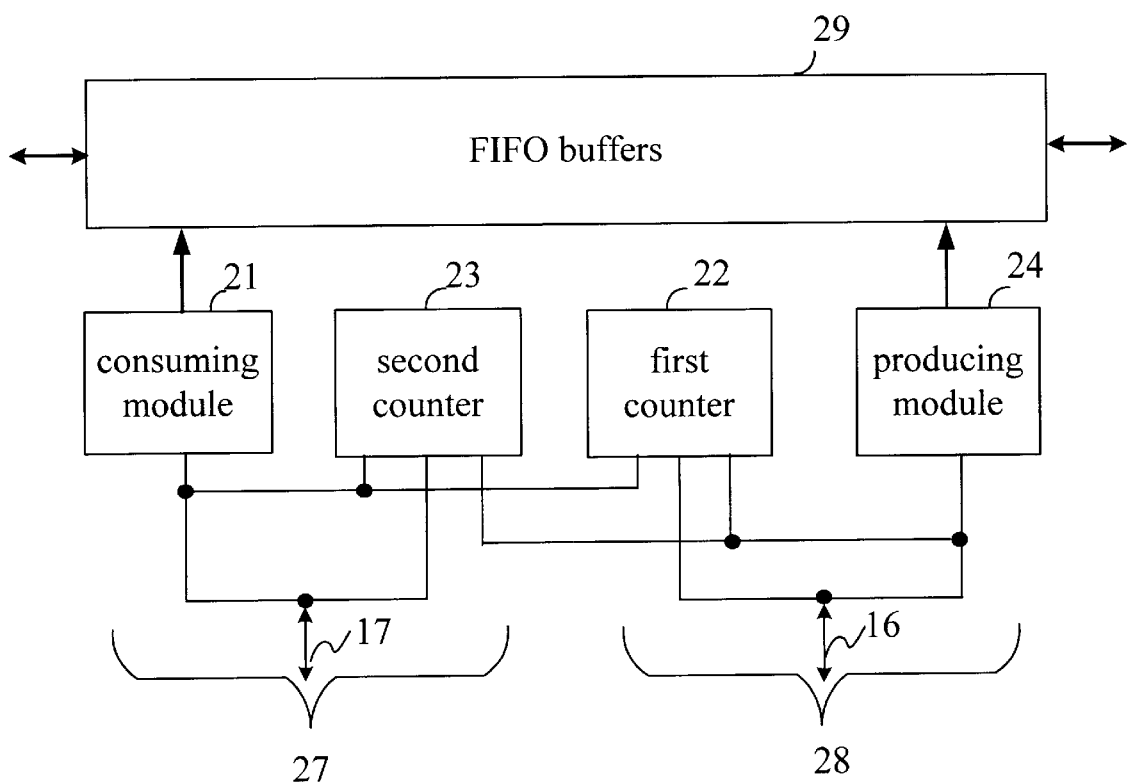
FIG. 2 is a schematic diagram of a prior art FIFO module.
Figure 4:
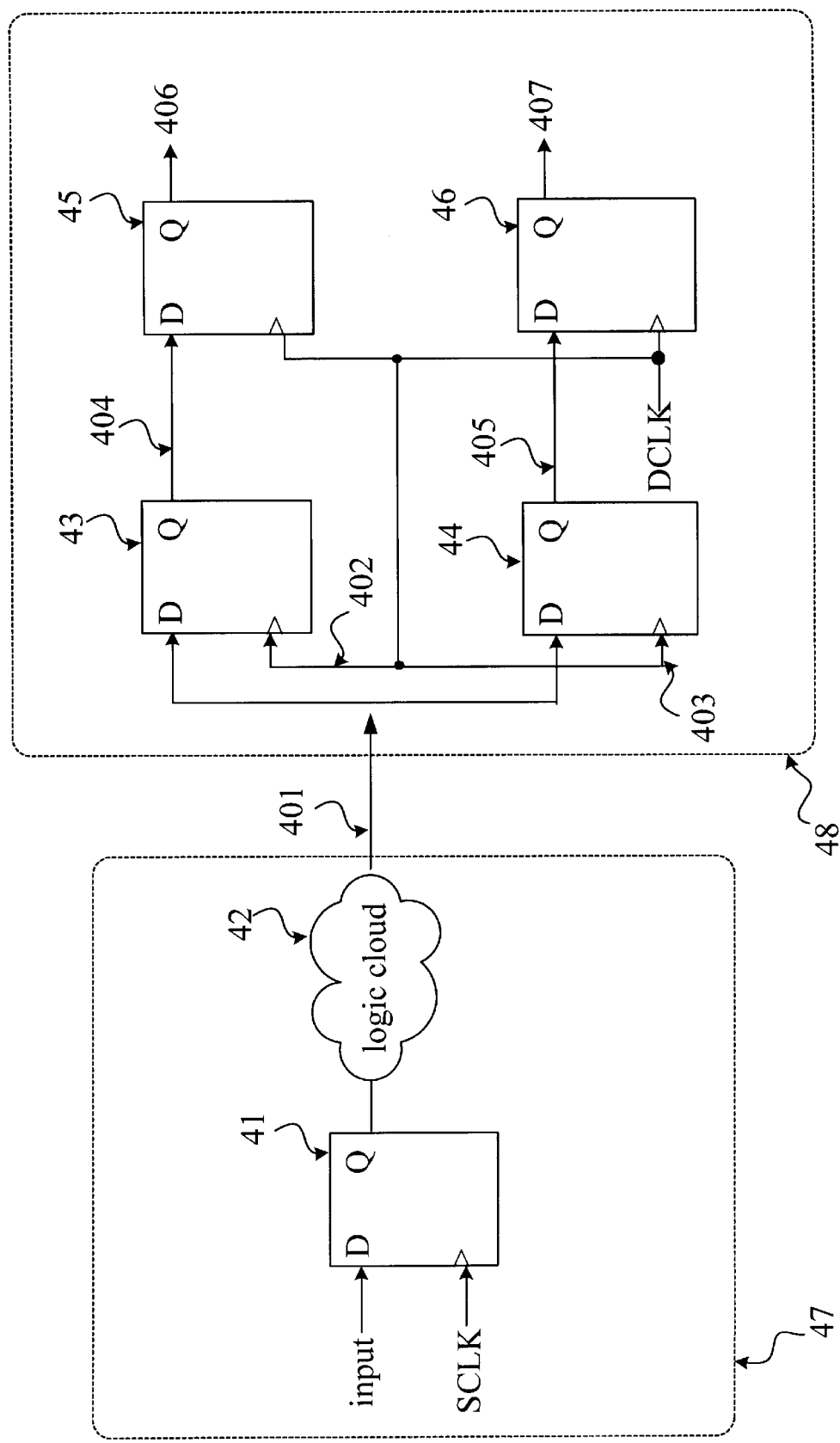
FIG. 4 is a structural diagram of a well-known simple synchronization circuit.
Figure 5:
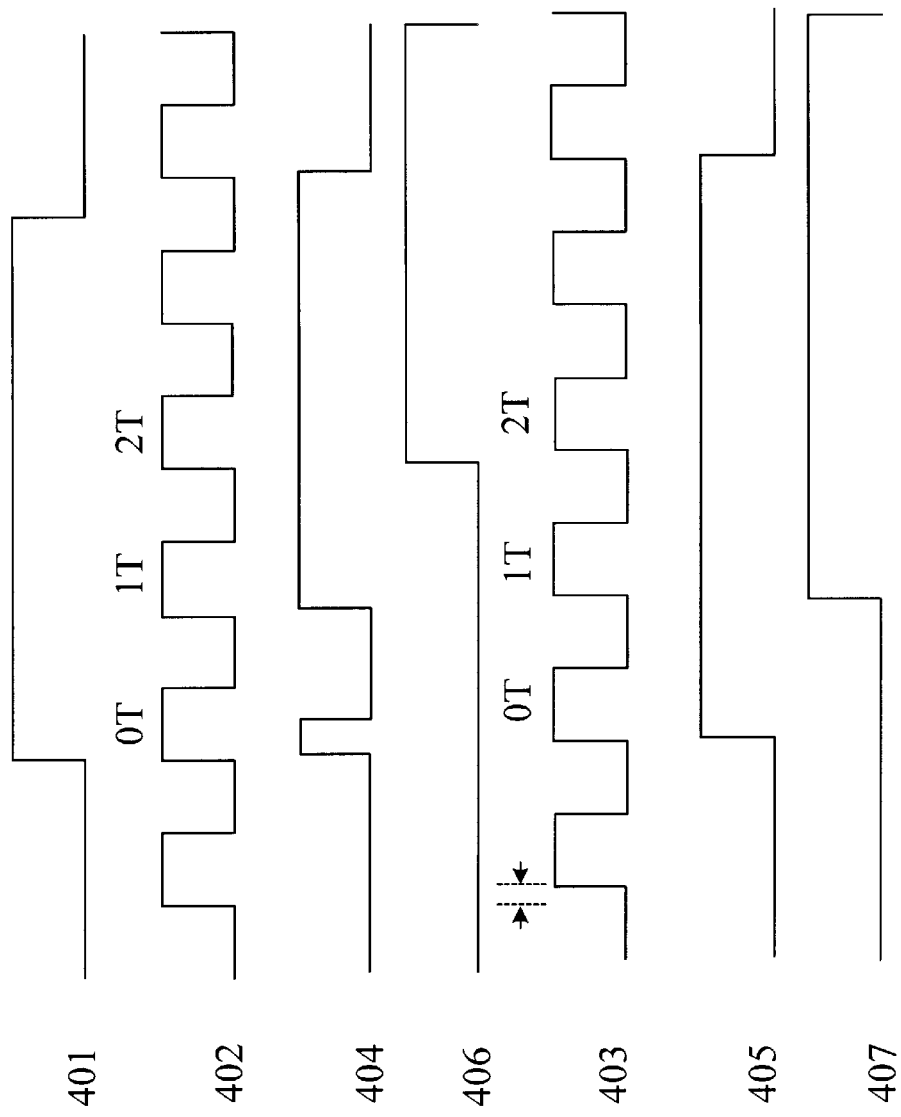
FIG. 5 is a timing diagram of FIG. 4.
Figure 7:
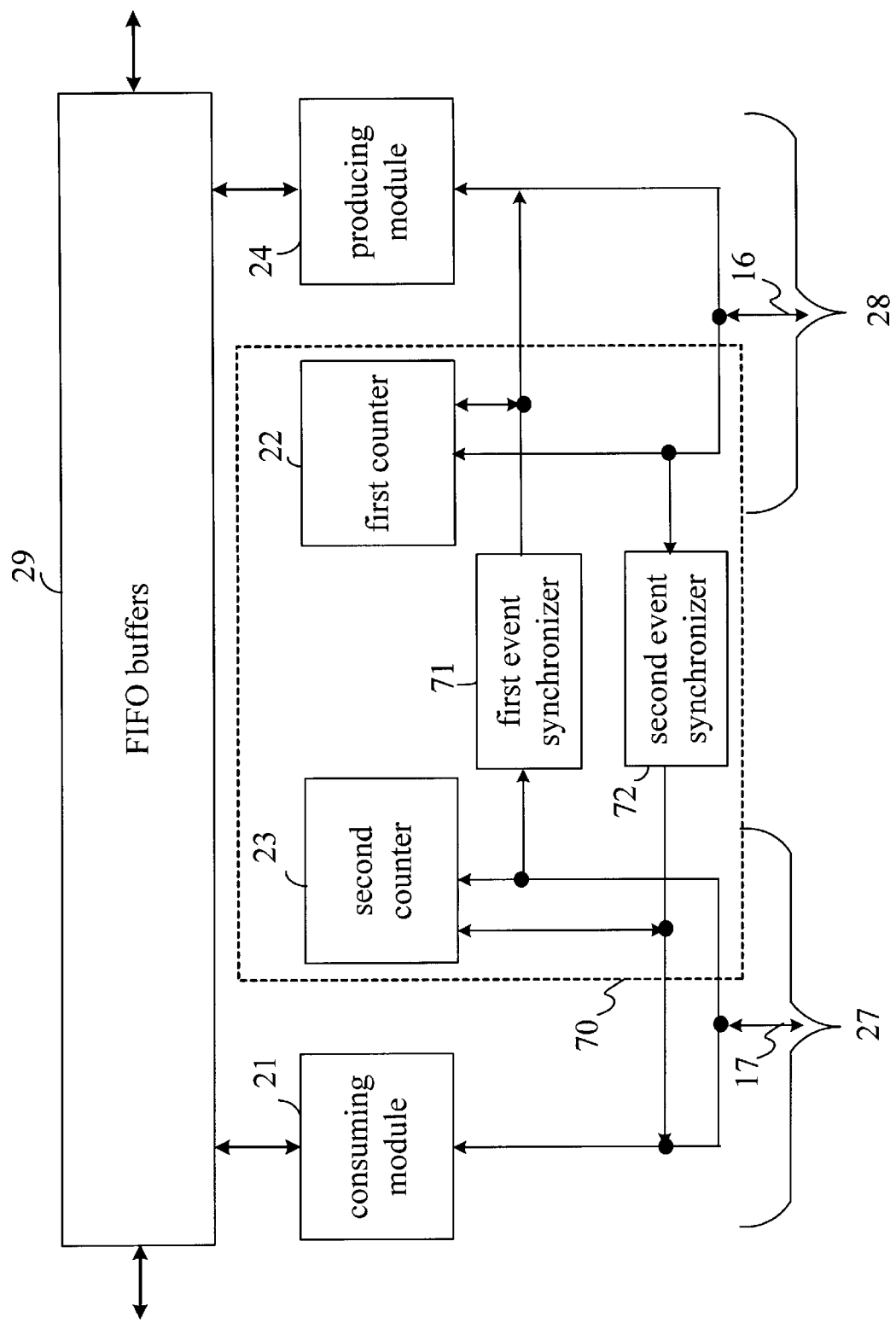
FIG. 7 is a schematic diagram of a multi-stage event synchronization apparatus according to the present invention.

FIG. 7 is a schematic diagram of a multi-stage event synchronization apparatus according to the present invention. The difference from the prior art as FIG. 2 shown is that a first event synchronizer 71 and a second event synchronizer 72 are employed in the present invention. The first event synchronizer 71 is used to convert the number of the incremental pop events in the consuming end 27 into the equal amount of events that can be captured by the clock SCLK (the same clock in origination agent 14) in edge-trigger type used in the producing end 28. The number of buffering data currently in the FIFO buffer is pointed by the updated content of the first counter 22 which is obtained by subtracting the output of the first event synchronizer 71 from the original content of the first counter 22. The first counter 22 will be first examined if a full condition occurs for every push event. If the full condition is not present, the first counter 22 counts up in accordance with the incremental number of the push events. The second event synchronizer 72 is used to convert the number of the incremental push events in the producing end 28 into the equal amount of events that can be captured by the clock DCLK (the same clock in destination agent 15) in edge-trigger type used in the consuming end 27. The number of buffering data currently in the FIFO buffer is pointed by the updated content of the second counter 23 which is obtained by adding the output of the second event synchronizer 72 to the original content of the second counter 23. The second counter 23 will be first examined if a empty condition occurs for every pop event. If the empty condition is not present, the second counter 23 counts up in accordance with the incremental number of the push events. The multi-stage event synchronization apparatus 70 comprises the first event synchronizer 71, the second event synchronizer 72, the first counter 22 and the second counter 23. The difference made in the invention from the prior art U.S. Pat. No. 6,055,285 is that the first event synchronizer 71 and the second event synchronizer 72 only transmit the incremental number of push events and pop events eliminating the use of a write address bus, a synched write pointer, a read address bus and a synched read pointer as in the prior art. Therefore the cost of the present invention is considerably inexpensive.

Supposing the frequency of the clock SCLK in the producing end 28 is larger than that of the clock DCLK in the consuming end 27, this means that the data producing speed in producing end 28 is larger than the data consuming speed in the consuming end 27. Under the circumstances, it is necessary to add multiple data paths in the second event synchronizer 72 in order to distribute and buffer the incremental number of push events in the producing end 28.

Figure 8:
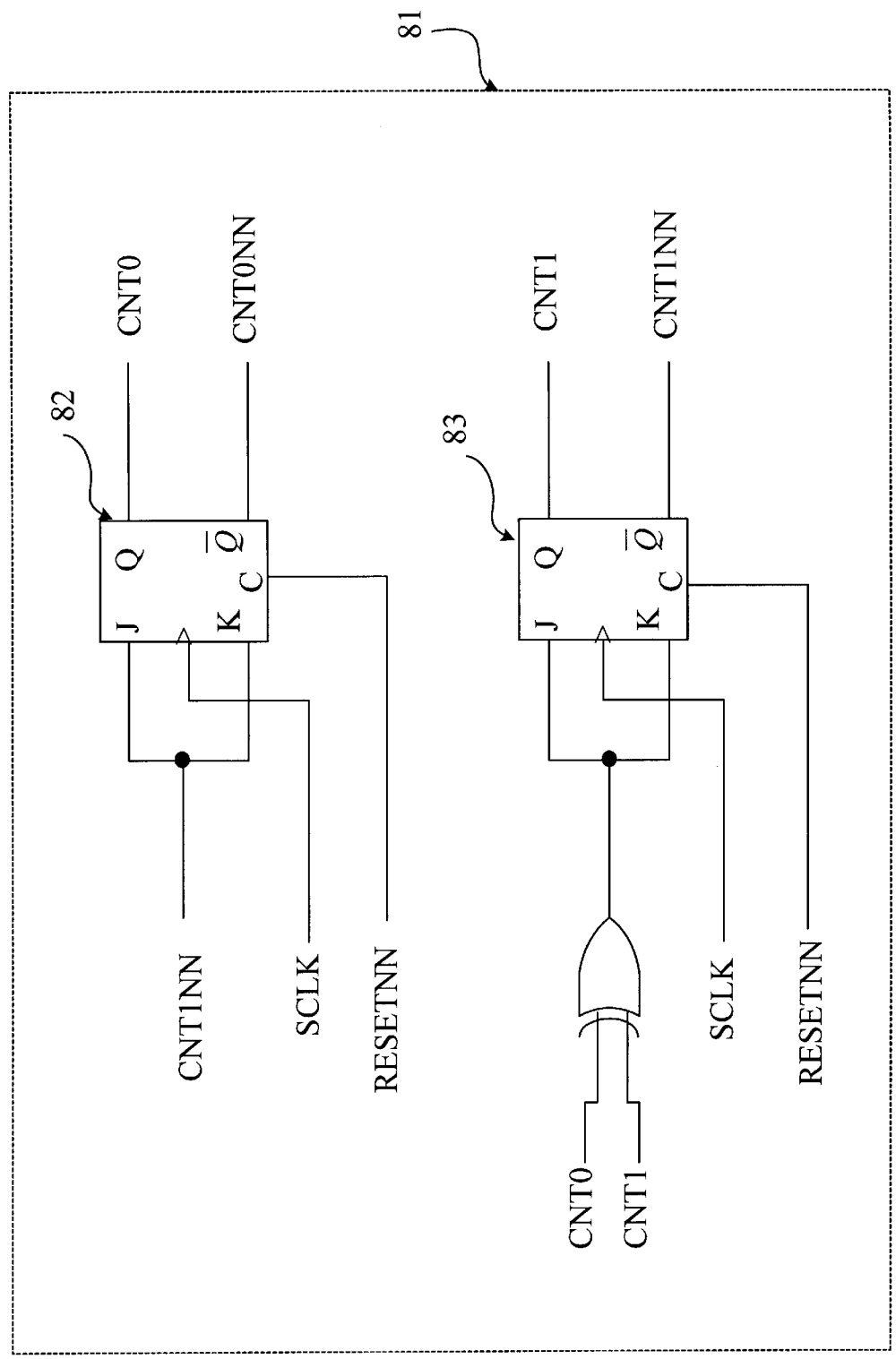
FIG. 8 is an embodiment of the present invention.

FIG. 8 is an embodiment of the present invention. It is supposed that the frequency of the clock SCLK in the producing end 28 is less than three times the frequency of the clock DCLK in the consuming end 27, and thus an encoding of divide-by-three can be obtained by a stage generation unit 81 in the second event synchronizer 72. The stage generation unit 81 comprises JK-type flip-flops 82 and 83 for generating signals CNT0 and CTN1 and their corresponding complements CNT0NN and CNT1NN respectively.

Figure 9:
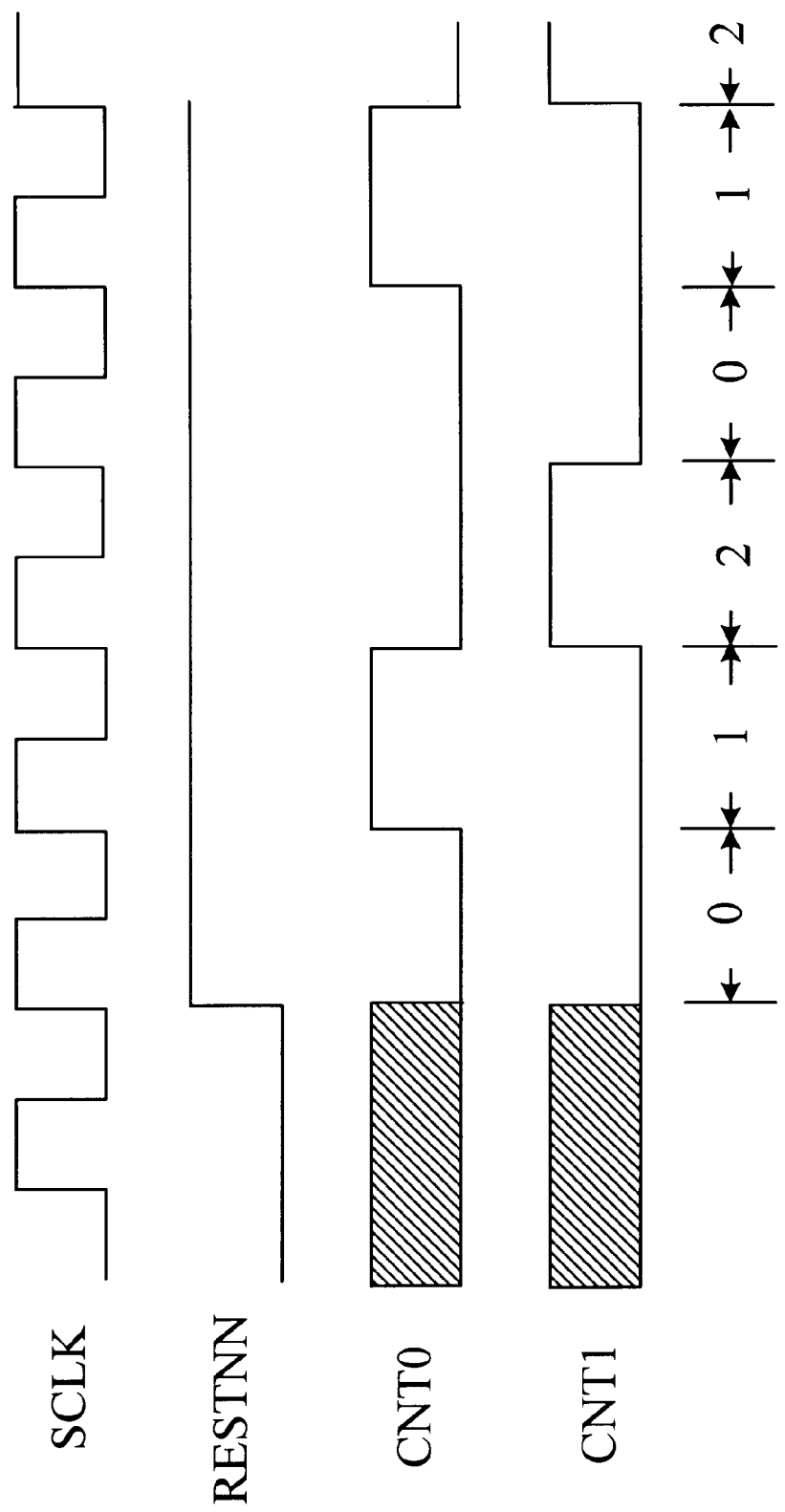
FIG. 9 is a timing diagram of FIG. 8.

FIG. 9 is a timing diagram of FIG. 8. After encoding the values of CNT0 and CNT1, a circular loop from 0 to 2 can be obtained. In other words, the circuit shown in FIG. 8 is a counter by 3.

Figure 10:
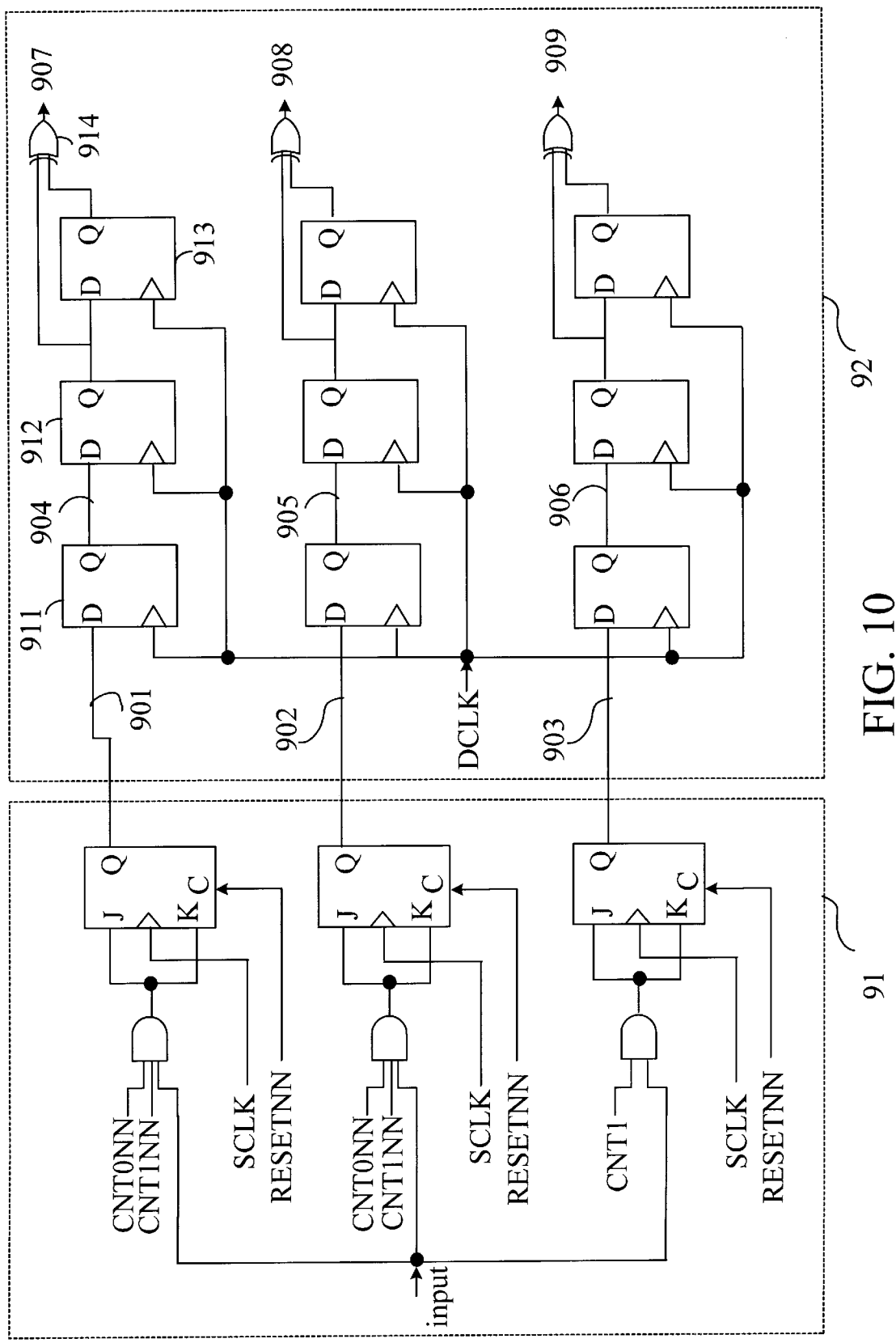
FIG. 10 is another embodiment of the present invention.

FIG. 10 is another embodiment of the present invention, comprising an event allocation unit 91 and a synchronization unit 92 in the second event synchronizer 72. The event allocation unit 91 is used to combine an input signal (that is, the input end of the second event synchronizer 72 shown in FIG. 7 or the incremental number of push events in producing end 28) and the values of CNT1, CNT0NN and CNT1NN in the stage generation unit 81 shown in FIG. 8. The input signal is allocated sequentially on the input ends 901, 902 and 903 of the three data paths, whose corresponding timing diagrams are shown as FIG. 11. In other words, the output of the stage generation unit 81 is served as the clock information for the event allocation unit 91. Since the frequency of the clock SCLK in the producing end 28 is less than three times the frequency of the clock DCLK in the consuming end 27, the three data paths will successfully receive the incremental number of the push events inputted from the producing end 28 and avoid any data loss. In other words, the use of clock DCLK in the consuming end 27 in the edge-triggered type to capture input signals is guaranteed any date loss if the frequency in the producing end 28 is less than three times the frequency in the consuming end 27, which means that three low-capacity pipes in the consuming end 27 are used to receive the output of a high-capacity pipe in the producing end 24. The synchronization unit 92 includes three data paths for generating one-shot signals 907, 908 and 909 corresponding to the three input points 901, 902 and 903. The three data paths of the synchronization unit 92 cooperate the event allocation unit 91 which appears to be a divide-by-three encoder. The number of data paths can be changed, depending on the ratio of the pulse widths of DCLK to SCLK, and therefore is not limited in the present invention. Each of the three data paths includes a first D-type flip-flop 911, a second D-type flip-flop 912 a third D-type flip-flop 913 and an XOR gate 914, wherein the clock input ends of the three D-type flip-flops 911~913 are connected to the clock DCLK in the destination unit 15, and the XOR gate 914 is used to generate a one-shot signal. The outputs 907~909 of the synchronization unit 92 are also the outputs of the second synchronizer 72 shown in FIG.7, and are further connected to the consuming module 21 and the second counter 23. The second counter 23 counts up for every one-shot signal received from each of the outputs 907~909 of the event synchronizer 72.

Figure 11:
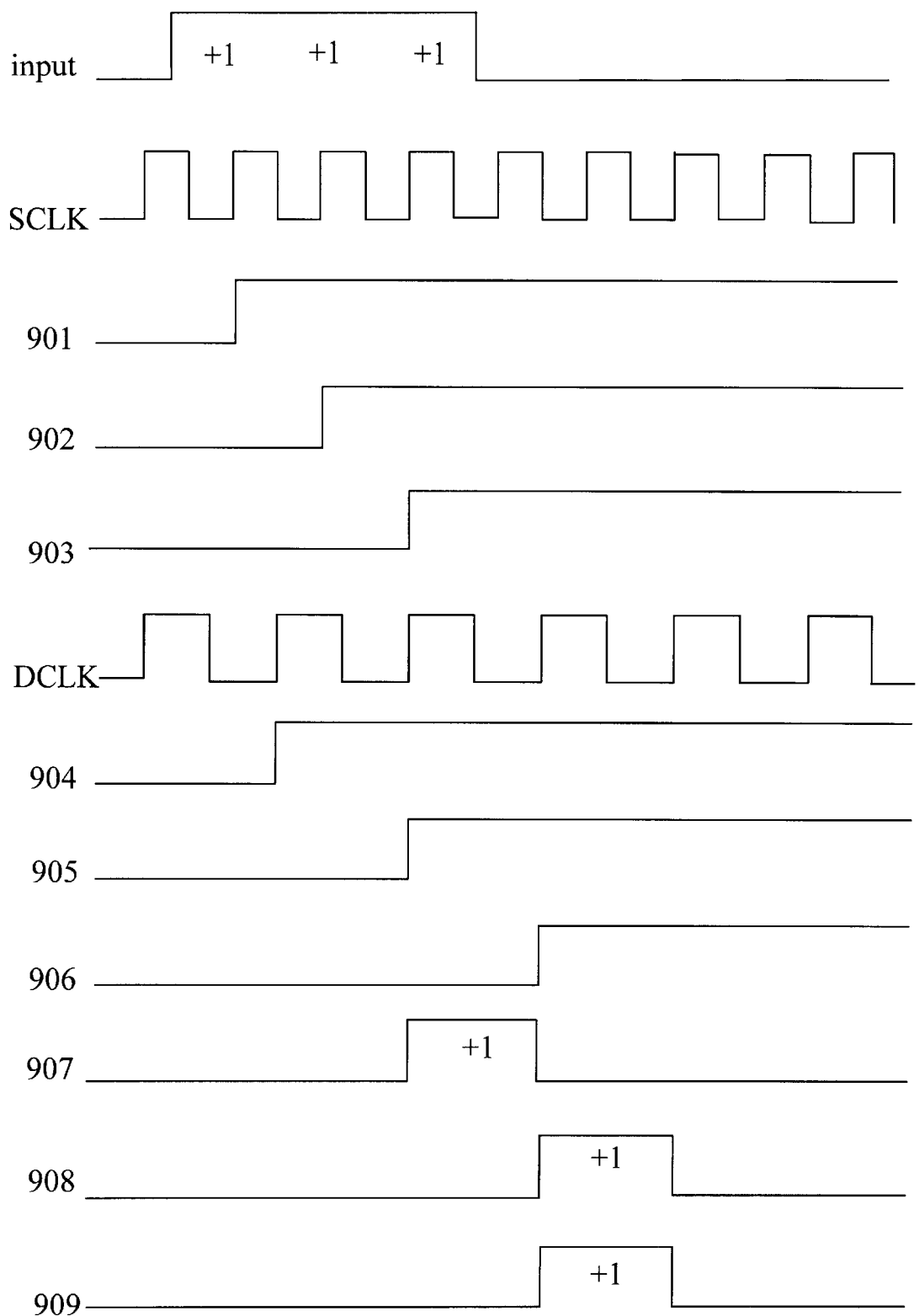
FIG. 11 is a timing diagram of FIG. 10.

FIG. 11 is a timing diagram of FIG. 10. In the timing diagram, it is obvious that the summation of the one-shot signals in the output ends 907~909 of the synchronization unit 92 fully represents the number of captured signals on the rising edge of the clock SCLK in edge-triggered form, and is successfully transferred to the number that the consuming end 27 can recognize without failure.

Supposing the pulse width of the clock SCLK in the producing end 28 is $T_{SCLK}$, and the pulse width of the clock DCLK in the consuming end 27 is $T_{DCLK}$, the stage number N, also the number of data paths in the synchronization unit 92, is generated in a form limited by equation (1):

$$N > T_{dclk}/T_{sclk} \qquad (1)$$

For example, if the result of $T_{dclk}$ divided by $T_{sclk}$ is 2.3, then the stage number N of the second synchronizer 72 can be selected as three. Particularly, if $T_{dclk}$ is equal to $T_{sclk}$, to prevent a phase shift between the clocks SCLK and DCLK, the stage number of the second synchronizer 72 can be better selected as two. Besides, some synchronization problems in the circuit between the consuming end 27 and the producing end 28, such as insufficient setup time and hold time, clock skew and signal jitter, can be eliminated by the simple synchronization circuit formed by the first to the third D-type flip-flops 911~913 of the synchronization unit 92.

The first event synchronizer 71 can be designed in the same way mentioned above, wherein the stage number M can be generated in a form limited by equation (2):

$$M > T_{sclk}/T_{dclk} \qquad (2)$$

For example, if the result of $T_{sclk}$ divided by $T_{dclk}$ is 0.7, then the stage number M of the first synchronizer 72 can be selected as one. Particularly, if $T_{dclk}$ is equal to $T_{sclk}$, to prevent any phase shift between the clocks SCLK and DCLK, the stage number of the first synchronizer 71 can be better selected as two.

All the above-mentioned embodiments assume that the frequency of the producing end 28 is larger than the frequency of the consuming end 27. On the other hand, a situation that the frequency of the consuming end 27 is larger than the frequency of the producing end 28 can also be applied according to the principle of the present invention.

The above-described embodiments of the present invention are intended to be illustrated only. Numerous alternative embodiments may be devised by those skilled in the art without departing from the scope of the following claims.

What is claimed is:

1. An apparatus of multi-stage event synchronization for accumulating the number of buffering data stored in an intermediate agent buffering data transmissions between an origination agent and a destination agent, said origination agent and said destination agent operating at different frequencies or at equal frequencies but different phases, comprising:

a first event synchronizer for converting a number of pop events executed in said destination agent into a number of sampled events that can be captured by a clock used in said origination agent;

a second event synchronizer for converting a number of push events executed in said origination agent into a number of sampled events that can be captured by a clock used in said destination agent;

a second counter, counting down by one if a pop event is executed in said destination agent, counting up by the number of synchronized push events sent from said second event synchronizer, and sending an empty signal if the content of said second counter is equal to a minimal number of buffers said intermediate agent can supply; and a first counter, counting up by one if a push event is executed in said origination agent, counting down by the number of synchronized pop events sent from said first event synchronizer, and sending a full signal if the content of said first counter is equal to a maximal number of buffers said intermediate agent can supply.

2. The apparatus of claim 1, wherein said second event synchronizer comprises:
a stage generation unit for generating an encoding of a stage number N, wherein N is an integer larger than the result of the pulse width of the clock used in said destination agent divided by the pulse width of the clock used in said origination agent;
an event allocation unit connected to said stage generation unit for averagely allocating push events executed in said origination agent into N-stage data paths; and
a synchronization unit connected to said event allocation unit for converting the number of push events in said N-stage data paths into the number of sampled events that can be captured by the clock of said destination agent.

3. The apparatus of claim 2, wherein each of said N-stage data paths comprises:
a first D-type flip-flop connected to the output of said event allocation unit;
a second D-type flip-flop connected to the output of said first D-type flip-flop;
a third D-type flip-flop connected to the output of said second D-type flip-flop; and
an XOR gate connected to the output of said third D-type flip-flop for generating said sampled event.

4. The apparatus of claim 1, wherein said first event synchronizer comprises:
a stage generation unit for generating an encoding of a stage number M, wherein M is an integer larger than the result of the pulse width of the clock used in said origination agent divided by the pulse width of the clock used in said destination agent;
an event allocation unit connected to said stage generation unit for averagely allocating pop events executed in said destination agent into M-stage data paths; and
a synchronization unit connected to said event allocation unit for converting the number of pop events in said M-stage data paths into the number of sampled events that can be captured by the clock of said origination agent.

5. The apparatus of claim 4, wherein each of said M-stage data paths comprises:
a first D-type flip-flop connected to the output of said event allocation unit;
a second D-type flip-flop connected to the output of said first D-type flip-flop;
a third D-type flip-flop connected to the output of said second D-type flip-flop; and
an XOR gate connected to the output of said third D-type flip-flop for generating said sampled event.

6. A system of multi-stage event synchronization for buffering data transmission between an origination agent and a destination agent, said origination agent and said destination agent operating at different frequencies or at equal frequencies but differing phases, comprising:
an FIFO buffer including an input end and an output end, said input end connected to said origination agent through a data bus, and said output end connected to said destination agent through another data bus;
a multi-stage event synchronization apparatus for accumulating a number of buffering data in said FIFO buffer, said apparatus converting a number of pop events executed in said destination agent into a number of sampled events that can be captured by a clock used in said origination agent, and converting a number of push events executed in said origination agent into a number of sampled events that can be captured by a clock used in said destination agent; if the result of the number of push events executed in said origination agent subtracting the number of pop events executed in said destination agent converted into the number of sampled events that can be captured by the clock used in said origination agent reaches a maximal number said FIFO buffer can supply, said apparatus transmitting a full signal; if the result of the number of push events executed in said origination agent converted into the number of sampled events that can be captured by the clock used in said destination agent subtracting the number of pop events executed in said destination agent reaches a minimal number said FIFO buffer can supply, said apparatus transmitting an empty signal;
a consuming module for generating a front pointer pointing to the location of said FIFO buffer being read;
a producing module for generating a rear pointer pointing to the location of said FIFO buffer being stored; and
a control module for controlling the data transmissions between said FIFO buffer, said origination agent and said destination agent; said control module stopping storing data into said origination agent if a full signal is present; said control module stopping sending data to said destination agent if an empty signal is presented.

7. The system of claim 6, wherein said multi-stage event synchronization apparatus comprises:
a first event synchronizer for converting the number of pop events executed in said destination agent into the number of sampled events that can be captured by a clock used in said origination agent;
a second event synchronizer for converting the number of push events executed in said origination agent into the number of sampled events that can be captured by a clock used in said destination agent;
a second counter, counting down by one if a pop event is executed in said destination agent, counting up by one if an event is sent from said second event synchronizer, and sending an empty signal if the content of said second counter is equal to the minimal number of buffers said FIFO buffer can supply; and
a first counter, counting up by one if a push event is executed in said origination agent, counting down by one if an event is sent from said first event synchronizer, and sending a fill signal if the content of said first counter is equal to the maximal number of buffers said FIFO buffer can supply.

8. The system of claim 7, wherein said second event synchronizer comprises:
a stage generation unit for generating an encoding of a stage number N, wherein N is an integer larger than the result of the pulse width of the clock used in said destination agent divided by the pulse width of the clock used in said origination agent;
an event allocation unit connected to said stage generation unit for averagely allocating push events executed in said origination agent into N-stage data path; and
a synchronization unit connected to said event allocation unit for converting the number of push events in said N-stage data path into the number of sampled events that can be captured by a clock of said destination agent.

9. The system of claim 7, wherein said first event synchronizer comprises:
- a stage generation unit for generating an encoding of a stage number M, wherein M is an integer larger than the result of the pulse width of the clock used in said origination agent divided by the pulse width of the clock used in said destination agent;
- an event allocation unit connected to said stage generation unit for averagely allocating pop events executed in said destination agent into M-stage data paths; and
- a synchronization unit connected to said event allocation unit for converting the number of pop events in said M-stage data paths into the number of sampled events that can be captured by the clock of said origination agent.

* * * * *